Patented Mar. 9, 1948

2,437,644

UNITED STATES PATENT OFFICE 2,437,644

SULFOFLUORIDES OF AZOIC DYESTUFFS

Hans Zacharias Lecher, Plainfield, Robert Prescott Parker, Somerville, and Corris Mabelle Hofmann, Bound Brook, N. J., assignors to American Cyanamid Company, New York, N. Y., a corporation of Maine No Drawing. Application July 31, 1944,
Serial No. 547,514

12 Claims. (Cl. 260—176)

1

This invention relates to azo coloring matters which are insoluble in water and which are capable of coloring cellulosic materials, fast shades of yellow.

Water insoluble azo coloring matters useful in dyeing cellulosic materials and frequently referred to as ice colors are produced from diazotized primary aromatic amines and coupling components, both of which are free from water solubilizing groups, such as sulfonic and carboxylic acid groups. The coupling components used in producing yellow ice colors are in the main arylides of acyl acetic acids, some of the most important being the bis-acetoacetic arylides obtained from p,p'-diaminodiphenyl compounds. These products show relatively high substantivity for cellulosic fibers. The yellow ice colors obtained from acyl acetic arylides with most of the known diazo components have predominantly redder shades which are often less desirable because they are inherently less brilliant. Those primary aromatic amines capable of producing greenish yellow shades are seriously limited because many of them are expensive; some of them present difficulties in diazotization and others produce greenish yellow shades of poor light and wash fastness.

The present invention is directed to a new series of water insoluble azo colors of greenish yellow shades for dyeing cellulosic material. The colors of the present invention are moderate in cost, easily prepared, and exhibit improved light and wash fastness.

The colors of the present invention are produced by coupling of arylamides of acyl acetic acids with diazotized primary aromatic amines of the benzine series containing at least one sulfonyl fluoride group. The benzine ring may also carry other substituents so long as they do not confer water solubilizing properties on the final dyestuff. Examples of typical substituents are alkyl, alkoxy, aralkoxy, aryloxy, beta-alkoxy-alkoxy, nitro, halogen, sulfone groups, sulfonamide groups, trifluoromethyl and cyano groups.

The surprising discovery has been made that the sulfonyl fluoride group is so strongly hypsochromic that its presence in the nucleus of the diazotized amines permits the production of the greener yellow shades with arylamides of acyl acetic acids. It is also unexpected that the dyestuffs should show improved fastness properties because sulfonyl halide groups are in general very reactive. Apparently in the azo compounds of the present invention, the sulfonyl fluoride

2 group does not behave as an ordinary sulfonyl halide group.

The colors of the present invention may be produced as pigments in the conventional way by diazotizing the particular amino benzene sulfonyl fluoride chosen and coupling with an arylamide of an acyl acetic acid in the presence of an acid binding substance. The pigments are then filtered off and when dried and pulverized are in general yellow to yellowish-orange in color and insoluble in water. If desired, the pigments may be prepared in the presence of a substrate where extended pigments are desired.

However, the most important practical field for the colors of the present invention is in dyeing cellulosic material. It is an advantage that the colors of the present invention may be readily dyed or printed on cellulosic material in the conventional manner, no new techniques being required and no unusual difficulties being encountered. Thus when goods are to be dyed, they are first padded with an alkaline solution of an arylamide of an acyl acetic acid and then subjected to a developing bath containing a diazotized amino benzene sulfonyl fluoride. This bath may be prepared by suitably buffering an acid diazo solution of the amine. When it is desired to print a design on the padded goods, a buffered diazo solution may be mixed with a suitable printing thickener in the customary manner, and the printing paste obtained used to print designs on the padded cloth. It is also possible to transform the diazotized amino benzene sulfonyl fluoride into a stable diazonium salt by isolating the zinc chloride double salt of the diazo which may then be dried or blended with alkali metal salts or metal salts, stored and used for dyeing or printing in the customary manner.

The present invention is not limited to any particular amino benzene sulfonyl fluorides. Some examples of typical members of the class are 3-amino benzene sulfonyl fluoride, 4-amino benzene sulfonyl fluoride, 3-amino-4-methyl benzene sulfonyl fluoride, 3-amino-4-chlorobenzene sulfonyl fluoride, 3-amino-4-methoxy benzene sulfonyl fluoride, 4-amino-5-nitrobenzene sulfonyl fluoride, 5-amino benzene-1,3-disulfonyl fluoride, 3-amino-4-trifluoromethyl benzene sulfonyl fluoride, 3,3'-diamino-5,5'-difluorosulfonyl diphenyl sulfone, 4-amino diphenyl-2-sulfonyl fluoride and 2-phenoxy-5-amino benzene sulfonyl fluoride.

Any of the well known arylamides of acyl acetic acids may be used such as arylamides of acetoacetic acid, furoyl acetic acid, benzoyl acetic acid, terephthaloyl-bis acetic acid and the like. The acids may also contain other substituents so long as these are not groups which impart water solubility to the resulting dyestuff.

The amine used in producing the arylide may be a simple primary aromatic amine such as aniline and its homologues which may be substituted by groups which do not impart water solubility to the final product or a naphthylamine or a heterocyclic amine such as an amine of the benzothiazole series. The acyl acetic arylamides derived from diamines are particularly important because they possess higher substantivity for cellulosic fibers. Typical examples of such compounds are the bis-acetoacetic and bis-benzoylacetic derivatives of benzidine, 3,3'-dichlorobenzidine, ortho-tolidine, ortho-dianisidine, 4,4'-diamino stilbene, paraphenylene diamine, or a diamine of the diphenylene oxide or diphenylene sulfone series.

The invention will be more fully illustrated in conjunction with the following examples which are meant to be illustrative only and not by way of limitation. All parts are by weight unless otherwise noted.

Example 1

A solution of 3.7 parts of 3-amino-4-methyl benzene sulfonyl fluoride in 72 parts of water containing 18 parts of 17% hydrochloric acid is stirred to 5° C. and is diazotized by the addition of 1.4 parts of sodium nitrite dissolved in 20 parts of water.

One-eighth part by volume of this solution is diluted with 300 parts of water. 150 parts of ice and 4 parts of sodium acetate are then dissolved in the solution.

1 part of bis-(acetoacetic)-o-tolidide is pasted with 2 parts of methyl alcohol, treated with 2.5 parts of 20% sodium hydroxide and is diluted with 200 parts of water. Five parts of cotton skein are wet out in a 1% soap solution, rinsed, wrung out and the skein is then turned in this bath while the temperature is raised to 45° C. over a period of one-quarter hour. The skein is turned at this temperature for an additional 15 minutes, and is then wrung out.

The cotton skein thus impregnated with the coupling component is now entered into the cold, buffered diazo bath prepared as described above and is continuously turned until full color has developed. The skein is removed from the diazo bath, is rinsed with fresh water, is treated in a 1% soap solution at 65° C., is rinsed with fresh water and is dried.

The cotton skein is evenly dyed a strong yellow of greenish shade.

Example 2

4.45 parts of 3-amino-4-methyl benzene sulfonyl fluoride are stirred in 50 parts of water containing 9.2 parts of hydrochloric acid (1.19) and are diazotized at low temperature by the addition of 1.64 parts of sodium nitrite dissolved in 5 parts of water. The diazo solution so prepared is diluted to 75 parts by volume.

8 parts by volume of this diazo solution are diluted with 12 parts of water, treated with 10 parts of 5% sodium acetate solution and 70 parts of a suitable carbohydrate thickener. This paste is printed from an engraved roll on cotton piece goods which have been previously impregnated with bis-(acetoacetic)-o-tolidide in an alkaline solution. The print so obtained is dried, is cleared at 60° C. in 3% soda ash solution, is treated in ½% soap solution at 65° C. The print is then rinsed in fresh water and dried. A brilliant greenish yellow pattern is obtained.

Example 3

4.2 parts of 3-amino benzene sulfonyl fluoride hydrochloride are dissolved in 45 parts of water containing 14.5 parts of hydrochloric acid (1.19) and at low temperature the solution is diazotized by addition of 1.4 parts of sodium nitrite dissolved in 15 parts of water. One-eighth part by volume of this diazo solution is diluted with 300 parts of water, 150 parts of ice, and is treated with 20 parts of 20% sodium acetate solution.

5 parts of cotton skein are well wet out in 1% soap solution and are rinsed in fresh water. The skein is then immersed in a solution containing 1 part of bis-(acetoacetic)-o-tolidide, 3 parts of methyl alcohol, 2.5 parts of 20% sodium hydroxide solution and 400 parts of water. While turning the skein, the temperature of this bath is raised to 45° C. and the skein is turned at this temperature for a period of one-quarter hour. The skein is removed, is wrung out and is then turned in the buffered diazo bath until color is fully developed. After finishing, the skein is levelly dyed a bright yellow of greenish shade.

Example 4

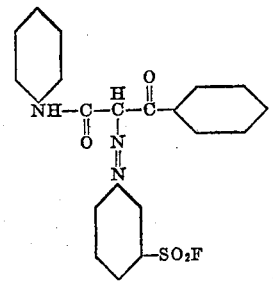

2.1 parts of 3-amino benzene sulfonyl fluoride hydrochloride are dissolved in 15 parts of water containing 15.2 parts of 17% hydrochloric acid, and at low temperature, the solution is diazotized by the addition of 10.1 parts of a 7% sodium nitrite solution. The diazo solution is clarified, and is then added to an alkaline solution of benzoyl acetic anilide prepared by stirring 2.6 parts of benzoyl acetic anilide with 3 parts of methanol, and then adding 2.2 parts of 20% sodium hydroxide, 75 parts of water, and 8 parts of sodium carbonate. The coupling is complete within 5 minutes. After stirring an additional 10 minutes, the orange pigment which separates out is filtered off, washed with cold water and dried at 40° C.

Example 5

*4-amino benzene sulfonyl fluoride*

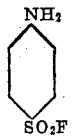

A 47% solution of potassium fluoride is prepared by dissolving 44.4 parts of potassium fluoride in 50 parts of water and to this solution 124 parts of 4-acetyl amino benzene sulfonyl chloride are added portionwise with efficient agitation. 100 parts of water are added to the reaction mixture which is then heated at 135°–140° C. for 2½ hours. After cooling the reaction mixture to 80° C., 200 parts of water are added and the reaction mixture is then stirred down to a temperature of 10° C. The solid which forms is filtered off and is well washed on the filter with cold water. The crude 4-amino benzene sulfonyl fluoride may be purified by crystallization from dilute hydrochloric acid and the free base may be liberated by treating a dilute hydrochloric acid solution with an alkaline carbonate. 4-amino benzene sulfonyl fluoride melts at 68°–69° C.

EXAMPLE 6

1.8 parts of 4-amino benzene sulfonyl fluoride are dissolved in 15 parts of water by the addition of 15.2 parts of 17% hydrochloric acid, and at low temperature are diazotized by the addition of 10.1 parts of 7% sodium nitrite solution. This diazo solution is clarified and is then divided into two equal portions. To each portion are added 150 parts of water, 10 parts of a 20% sodium acetate solution and 75 parts of ice. These buffered diazo baths are used to develop cotton skeins, prepared as described immediately below:

Two cotton skeins (5.0 parts each) are impregnated with coupling components in the following manner. The cottom skeins are wet out in 2% aqueous pine oil solution at 50° C., rinsed in fresh water and wrung out. The skeins are entered into prepare baths containing; 1.0 part coupling component, 5.0 parts methanol, 5 parts of 20% caustic and 250 parts water. While turning the skeins, the prepared baths are heated to 45° C. After turning the skeins at this temperature for one-quarter hour, they are removed and are wrung out. They are then separately developed in the above prepared diazo bath and are finished as described in Example 1.

| Coupling component | Skein dyeing |
|---|---|
| 1. Bis-(acetoacetic) benzidide | Lemon chrome yellow. |
| 2. Bis-(acetoacetic) para-phenylene diamide. | Strontian yellow. |

EXAMPLE 7

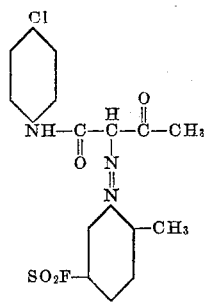

A solution of 1.9 parts of 3-amino-4-methyl benzene sulfonyl fluoride in 15 parts of water containing 15.2 parts of 17% hydrochloric acid is diazotized at 0° C .by the addition of 10.1 parts of a 7% sodium nitrite solution. This diazo solution is clarified and is then added to an alkaline solution of acetoacetic para-chloroanilide, prepared by stirring 2.2 parts of acetoacetic para-chloroanilide in 3 parts of methanol, then adding 2.2 parts of 20% sodium hydroxide, 75 parts of water and 6.9 parts of sodium carbonate. The coupling takes place immediately. After stirring 10 minutes, the orange pigment is filtered off, washed with water and dried at 40°. An orange-buff pigment is obtained.

EXAMPLE 8

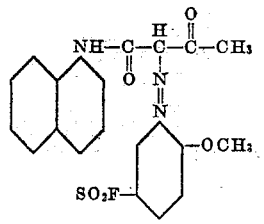

2.1 parts of 3-amino-4-methoxybenzene sulfonyl fluoride in 15 parts of water containing 15.2 parts of 17% hydrochloric acid are stirred to 0° C. and are diazotized by the addition of 10.1 parts of 7% sodium nitrite solution. After clarification, the diazo solution is added to an alkaline solution of acetoacetic alpha-naphthylamide. This latter solution is prepared by stirring 2.4 parts of acetoacetic alpha-naphthylamide in 3 parts of methyl alcohol, then adding 2.2 parts of 20% sodium hydroxide, 75 parts of water, and 6.9 parts of sodium carbonate. The mixture is stirred for one hour to complete the coupling. The orange pigment is filtered off, washed with water and dried at 40° C. A Mars orange pigment is obtained.

EXAMPLE 9

3-amino-4-chlorobenzene sulfonyl fluoride

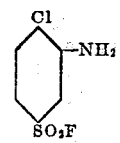

To a solution of 44.4 parts of potassium fluoride in 50 parts of water which is efficiently agitated are added 124.7 parts of 3-nitro-4-chlorobenzene sulfonyl chloride. The reaction mixture is stirred at 130°–135° C. for 2½ hours, is cooled to room temperature, is diluted with 175 parts of water and the crude 3-nitro-4-chlorobenzene sulfonyl fluoride is extracted with ether. After washing the ether extract with 2% aqueous sodium hydroxide solution and then with water, the extract is dried with anhydrous sodium sulfate, is filtered and the ether is removed by distillation. The residue is distilled under reduced pressure, 3-nitro-4-chlorobenzene sulfonyl fluoride distilling at 138°–140° C. at 5 mm. of mercury pressure. The distillate solidifies, the pure product melting at 58°–60° C.

62.2 parts of 3-nitro-4-chlorobenzene sulfonyl fluoride in 208 parts of hydrochloric acid are treated at 35°–40° C. portionwise with 72 parts of tin. When reduction is complete, the tin double salt of 3-amino-4-chlorobenzene sulfonyl fluoride is filtered off. The residue is stirred in 1000 parts of water and the slurry is treated at 0°–5° C. with soda ash until the solution is basic to brilliant yellow test paper. The resulting slurry is extracted with ether, the ether extract is dried over sodium sulfate and after filtration the ether is removed by distillation. The residual 3-amino-4-chlorobenzene sulfonyl fluoride may be further purified by crystallization from dilute alcohol solution and when pure melts at 64°–66° C.

EXAMPLE 10

A mixture of 15.6 parts of 3-amino-4-chlorobenzene sulfonyl fluoride, 25 parts of hydrochloric acid (1.19) and 50 parts of water is boiled until the base dissolves. The solution is cooled to 0° C. and 5.2 parts of sodium nitrite dissolved in 30 parts of water are gradually added. After clarification of the diazo solution, 25.5 parts of zinc chloride as a 50% solution and 25 parts of sodium chloride respectively are added. The zinc chloride double salt of the diazonium chloride which separates from solution is collected on the filter and the residue is dried at low temperature.

1.35 parts of this product are well mixed with 3.7 parts of aluminum sulfate octa-hydrate.

2.0 parts of this color blend are dissolved in 28 parts of water and are treated with 70 parts of suitable carbohydrate thickener. This color paste is printed from an engraved roll on cotton piece goods previously impregnated with bis-(acetoacetic) benzidide in an alkaline bath. The print is dried, is rinsed in fresh water and is treated at 65° C. in a ½% soap solution. The print is rinsed in fresh water and is dried.

An even yellow pattern of strong greenish shade is obtained.

We claim:

1. An azo compound having the following formula:

[A—N=N—]$_n$B in which A is the residue of a diazotized amino benzene sulfonyl fluoride free from water solubilizing groups, B is an ice color coupling component of the acyl acetic arylide series the arylide being selected from the group consisting of arylides of the benzene series, arylides of the diphenyl series, and arylides of the naphthalene series, and $n$ is a member selected from the group of one and two.

2. An azo compound having the following formula:

[A—N=N—]$_n$B$_1$ in which A is the residue of a diazotized amino benzene sulfonyl fluoride free from water solubilizing groups, B$_1$ is an ice color component of the acetoacetic arylide series the arylide being selected from the group consisting of arylides of the benzene series, arylides of the diphenyl series, and arylides of the naphthalene series, and $n$ is a member selected from the group of one and two.

3. An azo compound having the following formula:

[A$_1$—N=N—]$_n$B in which A$_1$ is the residue of a diazotized amino benzene mono sulfonyl fluoride free from water solubilizing groups, B is an ice color coupling component of the acyl acetic arylide series the arylide being selected from the group consisting of arylides of the benzene series, arylides of the diphenyl series, and arylides of the naphthalene series, and $n$ is a member selected from the group of one and two.

4. An azo compound having the following formula:

[A$_1$—N=N—]$_n$B$_1$ in which A$_1$ is the residue of a diazotized amino benzene mono sulfonyl fluoride free from water solubilizing groups, B$_1$ is an ice color component of the acetoacetic arylide series the arylide being selected from the group consisting of arylides of the benzene series, arylides of the diphenyl series, and arylides of the naphthalene series, and $n$ is a member selected from the group of one and two.

5. An azo coloring matter having the following formula:

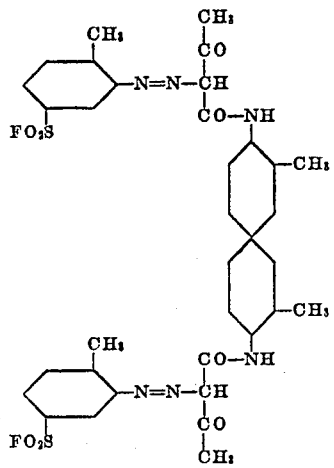

6. An azo coloring matter having the following formula:

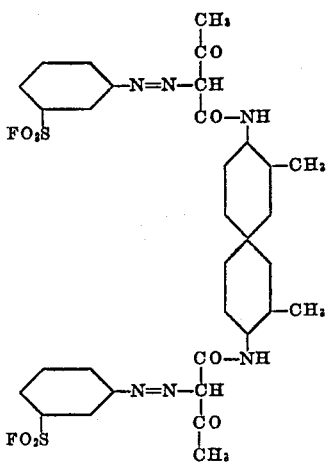

7. An azo coloring matter having the following formula:

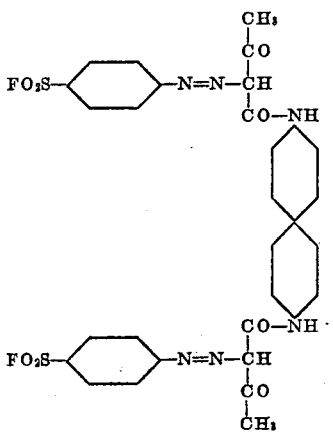

8. A method of preparing water insoluble azo colors which comprises diazotizing an amino benzene sulfonyl fluoride free from water solubilizing groups and coupling it with an ice color coupling component of the acyl acetic arylide series the arylide being selected from the group consisting of arylides of the benzene series, arylides of the diphenyl serie, and arylides of the naphthalene series.

9. A method of preparing water insoluble azo colors which comprises diazotizing an amino benzene sulfonyl fluoride free from water solubilizing groups and coupling it with an ice color coupling component of the acetoacetic arylide series the arylide being selected from the group consisting of arylides of the benzene series, arylides of the diphenyl series, and arylides of the naphthalene series.

10. A method according to claim 9 in which the amino benzene sulfonyl fluoride has only a single sulfonyl fluoride group.

11. A material containing fibers free from basic nitrogenous groups dyed with an azo dye of claim 1.

12. A material containing fibers free from basic nitrogenous groups dyed with an azo of claim 5.

HANS ZACHARIAS LECHER.
ROBERT PRESCOTT PARKER.
CORRIS MABELLE HOFMANN.

REFERENCES CITED

The following references are of record in the file of this patent:

UNITED STATES PATENTS

| Number | Name | Date |
| --- | --- | --- |
| 1,762,022 | Laska et al. | June 3, 1930 |
| 1,879,223 | Hardtmann | Sept. 27, 1932 |
| 1,941,057 | Runne et al. | Dec. 26, 1933 |
| 2,154,186 | Schweitzer et al. | Apr. 11, 1939 |